No. 735,280. PATENTED AUG. 4, 1903.
E. B. MILLAR.
TOP FOR SPICE BOXES.
APPLICATION FILED APR. 13, 1903.
NO MODEL.

Witnesses
Geo. E. Winton.
Margarete C. Nickelson.

Inventor
Earl B. Millar,
By Hazard & Harpham
Attorneys.

THE NORRIS PETERS CO., PHOTO-LITHO., WASHINGTON, D. C.

No. 735,280. Patented August 4, 1903.

UNITED STATES PATENT OFFICE.

EARL B. MILLAR, OF LOS ANGELES, CALIFORNIA.

TOP FOR SPICE-BOXES.

SPECIFICATION forming part of Letters Patent No. 735,280, dated August 4, 1903.

Application filed April 13, 1903. Serial No. 152,452. (No model.)

*To all whom it may concern:*

Be it known that I, EARL B. MILLAR, a citizen of the United States, residing at Los Angeles, in the county of Los Angeles and State of California, have invented new and useful Improvements in Tops for Spice-Boxes and the Like, of which the following is a specification.

The object of my invention is to provide simple and reliable means whereby the movable stopper pivoted on the top of the lid can be made to stop at a point where the holes therein will register with the holes in the lid of the box, and thereby permit the contents to be shaken out of the box, and when moved in the opposite direction to the limit of its movement the holes in the revoluble stopper will be out of alinement with the holes in the lid, and thereby close the opening through the lid and the swinging stopper and prevent the contents from being shaken out. I accomplish this object by means of the device described herein and shown in the accompanying drawings, in which—

Figure 1:
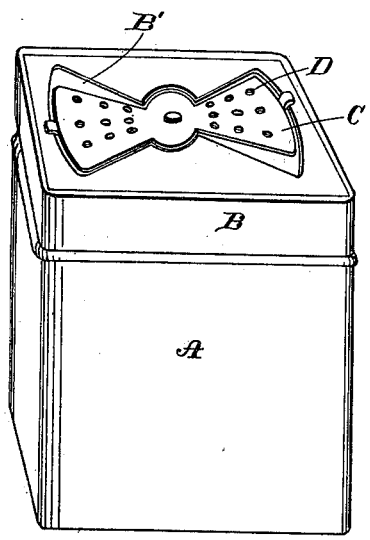
Figure 2:
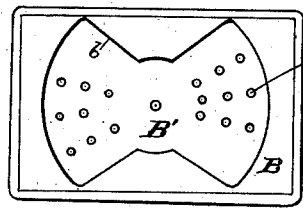
Figure 3:
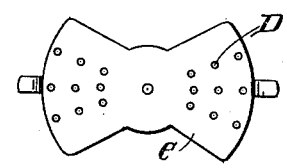
Figure 4:
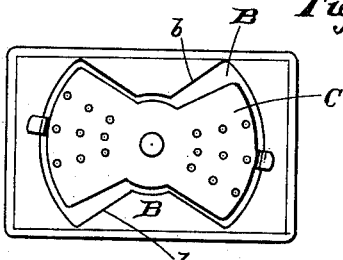

Figure 1 is a perspective view of a spice-box embodying my invention. Fig. 2 is a top plan view of a spice-box with the swinging stopper removed. Fig. 3 is a view of the swinging stopper removed from the lid. Fig. 4 is a top plan view of a spice-box embodying my invention.

In the drawings, A is the spice-box. B is the lid thereof.

C is the swinging stopper, having perforations D therethrough, pivoted on the top of the lid and adapted when moved around to the extreme limit of its movement in one direction to cause the perforations in the stopper to register with perforations E in the lid B, and when moved in the opposite direction to the limit of its movement the perforations therein will move out of alinement with the perforations in the lid and close the passage through the lid and stopper, closing the same.

Heretofore spice-boxes and the like have been constructed with a circular swinging stopper pivoted on the top of the lid having perforations therethrough adapted to register with perforations in the lid of the box when the swinging stopper is in a certain point in its revolution, thereby affording an opening through which the contents of the box can be shaken, and by the further movement around of the perforated stopper the openings through the lid and the stopper are closed; but no arrangements have been made to limit the movement around of the perforated stopper, and it is with difficulty that the exact point where the stopper should be stopped in its movement around on its pivoted center is found so that the openings therein will register with the openings in the lid, and the result is these openings in the stoppers are more liable to pass the openings in the lid than to stop immediately thereover, the result being considerable difficulty and annoyance in the use of these spice-boxes. By my improvement the movement in either direction of the swinging perforated stopper is limited to the exact point desired, so that no mistake or trouble is occasioned to open the top, so that its contents can be shaken out, or to close it by reverse movement of the stopper, so that its contents cannot be shaken out. In the lid of the spice-box shown in the drawings a depression B' is struck in the lid when it is made. The swinging stopper C is pivoted in and moves around in this depression, the edges *b* thereof affording a lug or stop against which the swinging cover contacts on the limit of its movement in either direction, affording means whereby the swinging cover will stop in proper position, so as to leave an opening through the cover and the stopper or entirely close the same.

Having described my invention, what I claim as new, and desire to secure by Letters Patent, is—

As an article of manufacture, a top for spice-boxes having an hour-glass-shaped flat depression with openings therein, in combination with a perforated swinging stopper pivoted centrally in the depression and of less width than the depression, its perforations arranged and adapted to register or not with the openings in the depression accordingly as the stopper is swung in one direction or the other, the edges of the depression forming stops for the stopper in these extreme movements thereof.

In witness that I claim the foregoing I have hereunto subscribed my name this 6th day of April, 1903.

EARL B. MILLAR.

Witnesses:
HENRY T. HAZARD,
G. E. HARPHAM.